United States Patent [19]

Nazemi

[11] 3,919,053

[45] Nov. 11, 1975

[54] ASSEMBLY FOR SPECIMEN CULTURING

[76] Inventor: Malek M. Nazemi, Eastwood Medical Center, 10301 Gateway West, El Paso, Tex. 79925

[22] Filed: Sept. 10, 1973

[21] Appl. No.: 395,770

[52] U.S. Cl. .............. 195/139; 195/142; 195/127
[51] Int. Cl.² .......................................... C12B 1/00
[58] Field of Search.................. 195/139, 127, 142

[56] References Cited
UNITED STATES PATENTS
3,276,589    10/1966    Jankay .................. 195/142

*Primary Examiner*—Alvin E. Tanenholtz
*Attorney, Agent, or Firm*—John Paul Robinson, Jr.

[57] ABSTRACT

A specimen culturing assembly for cultivation of a specimen simultaneously under both anaerobic and aerobic environmental conditions. This assembly is especially adapted for collecting and simultaneously culturing micro-organisms suspended in a fluid (such as, blood, milk, urine, pus, etc.). The assembly comprises an anerobic container and an aerobic container releasably locked or clamped together. A special valve and tube structure allows a laboratory technician to alternately direct the fluid containing the micro-organisms into the aerobic container and then into the anaerobic container.

10 Claims, 3 Drawing Figures

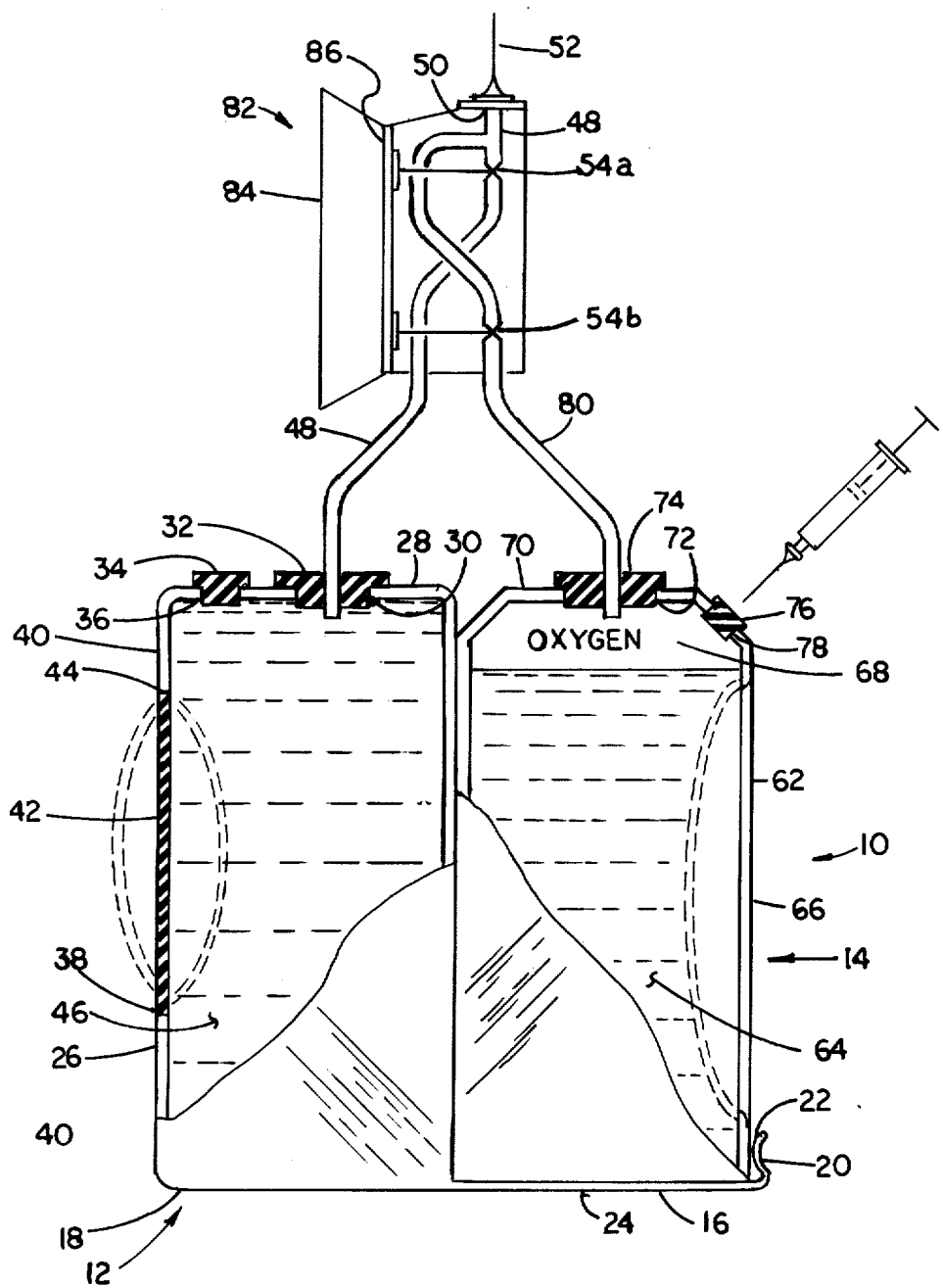
FIG. I

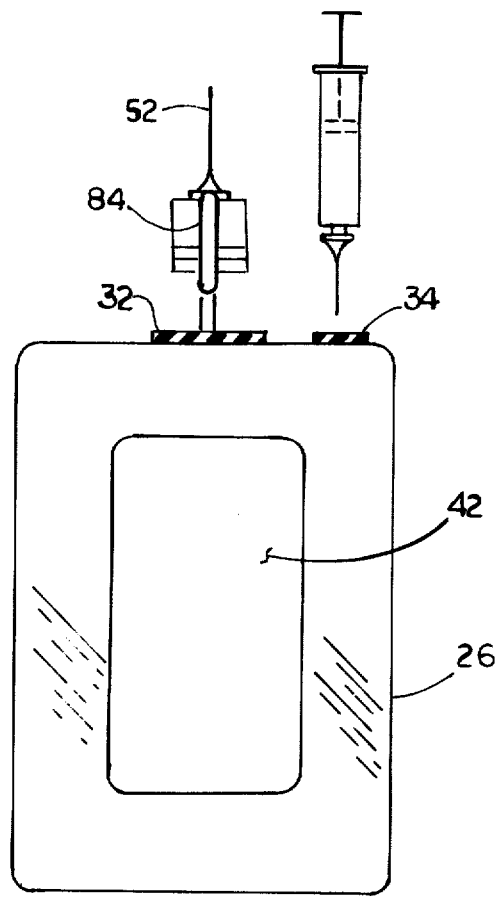
FIG II
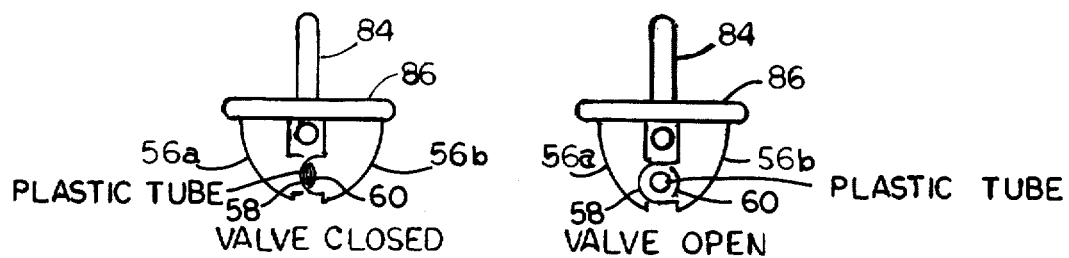
FIG. III

ASSEMBLY FOR SPECIMEN CULTURING

The invention relates to collecting and culturing a specimen under both anerobic and aerobic environmental conditions.

The following U.S. Pat. Nos. were garnered in a preliminary search of the prior art: (1) 3,647,386 to S. R. Gilford; (2) 3,433,712 to H. W. Gerarde; (3) 3,181,529 to E. H. Wilburn; (4) 3,045,494; and (5) 2,832,344 to E. Davidson.

Accordingly, a major object of the present inventive concept is to provide a new and extremely simple specimen collector and culturing assembly which is reliable in operation, simple to fabricate, and is constructed and arranged to minimize the number of operations required to collect a specimen under both anaerobic and aerobic conditions.

Another object is to provide a specimen collecting and culturing assembly which is extremely economical to construct and maintain.

A still further object of the present inventive concept is to provide a specimen collecting and culturing assembly which because of its compactness and simplicity of design has a field of its own, as this assembly can be readily utilized almost simultaneously to collect samples of a specimen under aerobic and/or anaerobic conditions.

Other objects and important features of the present inventive concept will be apparent from a study of the specification following, taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and all such other embodiment or modifications are intended to be reserved especially as they fall within the scope and spirit of the subjoined claims.

In the drawing:

FIG. I is a cross-sectional view of the present inventive concept.

FIG. II is a front elevational view of the anaerobic unit of the present inventive concept.

FIG. III is a fragmentary cross-sectional view of the valve mechanism employed in the present inventive concept.

Certain terminology will be used in the following description for convenience in reference only and will not be limiting. The words "upwardly", "downwardly", "rightwardly", and "leftwardly" will designate directions in the drawing in which reference is made. The words "inwardly" and "outwardly" will refer to directions toward and away from, respectively, the geometric center of the anaerset assembly and designated parts thereof. Said terminology will include the words above specifically mentioned, derivatives thereof and words of similar import. Further, it will be understood that the following description of the anaerset assembly has been selected for illustrative purposes only as a convenient and appropriate means for acquainting those skilled in the art with the present invention.

For the purpose of disclosure of the anaerset assembly embodying the present inventive concept, reference is now made in greater detail to the drawings; wherein FIGS. I, II and III illustrate the anaerset assembly generally indicated at 10. The assembly 10 includes an anaerobic unit 12 and aerobic unit 14 mounted or disposed in a close, side by side or faying relationship.

In FIG. I a structural clip member 16 extends outwardly and substantially parallel to the bottom wall 18 of anaerobic unit 12, for releasably clamping anaerobic unit 12 to aerobic unit 14. The extreme end spring portion 20 of clip member 16 extends generally upwardly and substantially normal to leg portion 24. The end portion 20 has an inwardly extending arcuate surface 22 which effectively abutts or contacts and biases aerobic unit 14 into a close or faying relationship with anaerobic unit 14.

The entire structural clip member 16 can be fabricated as a unit of a resilient plastic, metal or other suitable material, however, if desired only the extreme end portion 20 can be of a resilient material and the interjacent or leg portion 24 can be of a rigid material having a greater tensile strength than end portion 20. The above description depicts the preferred structure to releasably clamp or lock the two units 12 and 14 together, however, any other type of releasable clamp can be employed, for example, a simple rubber band can be positioned to encircle both units 12 and 14 for releasably clamping them together.

The anaerobic unit 12 generally includes a container 26 manufactured from a substantially rigid material such as plexiglas. However, any plastic or other suitable material which will not contaminate and is compatable with the specimen being handled or analyzed can be effectively utilized. The top-wall 28 of container 26 is provided with an opening 30 (See FIG. I) in which is disposed a flexible, gas-impermeable closure or stopper member 32 which can be made of rubber or other conventional material. In addition, a small, relatively thick, gas-impermeable rubber stopper or membrane 34 is disposed in and completely covers another relatively small hole 36 which is, likewise, positioned in top-wall 28. An elongate opening 38, disposed in outwardly facing side-wall 40 of container 26, is completely covered by gas-impermeable, flexible membrane 42. Flexible membrane 42 is fixedly secured to the edge portion 44 of side-wall 40, which defines elongate opening 38 in a conventional manner so a gas-impermeable seal is effected therebetween. This gas tight seal can be created when a suitable adhesive is applied to the edge portion 44 and the membrane 42 is positioned in superposed relationship thereto; or the edge portions of membrane can be so constructed and arranged to frictionaly grip or clamp the complementary edge portion 44 of wall portion 40 to effectively create a fluid seal therebetween.

The container 26 encloses a sterile prereduced culture medium 46, such as, peptone yeast glucose, starch medium, brain-heart-infusion broth, and other conventional types of liquid culture medium as required. A hollow sterile plastic tube 48 is inserted completely through stopper member 32 and communicates with the interior of container 26. The resilient stopper member 32 effects a gas tight seal about the outer peripheral surface of tube 48, thereby inhibiting the ingress of oxygen and/or other fluids into container 26. The other open end 50 of tube 48 is open to the ambient atmosphere or a hollow needle means 52 can be secured to the open end 50 of tube 48 with said needle communicating with the interior of tube 48. In the illustrated embodiment, a flexible clamp means 54a is movable between an open and closed position, which permits the flow of fluid through tube 48 or prohibits fluid flow through tube 48. The valve illustrated in FIG. III can be substituted for clamp means 54a and 54b if desired. The valve illustrated in FIG. III has two outwardly biasing leaf spring portions 56a and 56b which force inner clamping legs 58, 60 toward each other and into clamping engagement with plastic tube 48, whereby no fluid can flow through tube 48. When a lab technician's fingers apply an inwardly directed force to both leaf spring portions 56 a and 56b, clamping legs 58, 60 are forced outwardly away from plastic tube 48 which permits the flow of fluid through tube 48, from a specimen source into the interior of container 26.

The aerobic unit 14 generally includes a container 62 made of a plastic material which will not contaminate the sterile medium 64 enclosed within container 62. At least one side-wall 66 is flexible and resilient to the extent that it will flex when a lab technician forces it inwardly with a finger (see FIG. I). The bottle or container 62 will inherently return to its normal configuration when the force being applied is removed therefrom. The above described movement is illustrated in FIG. I; the broken lines show the inwardly movement of a flexible side-wall 66 when a force is applied thereto. The side-wall 66 is shown in a solid line when in a normal relaxed configuration. The space 68 above medium 64 is generally occupied by air, oxygen or a gas containing oxygen. The top-wall 70 is provided with an opening 72 (FIG. I) in which is disposed a flexible gas-impermeable stopper or closure member 74 that is made of rubber or some other suitable material. Another smaller relatively thick gas-impermeable rubber membrane 76 is positioned within and covers hole 78 which can be disposed in top-wall 70 or can be positioned in an upper portion of any side-wall. A hollow sterile plastic tube 80 has one end extending completely through stopper member 74 which, because of its resiliency, effects a fluid seal around the outer circumference of tube 80; thereby preventing the sterile container 62 from becoming contaminated by impurities. The other end of tube 80 is connected to and communicates with the interior of tube 48. The other end of tube 80 is connected to tube 48 between open end 50 and valve means 54a. A valve means 54b, which is identical to valve means 54a described above and illustrated in FIG. I, is movable between an open position which permits the flow of fluid from open end 50 into the interior of container 62; and a closed position which inhibits the flow of fluid through tube 80. It is apparent that by utilizing the present assembly, a sample of a specimen can be readily obtained under both aerobic and anaerobic conditions.

The valves 54a and 54b are mounted on a plastic T-shaped member 82 which allows a lab technician to direct and thrust the needle 52 into a patient's flesh and into communication with a vein or other fluid pocket. The T-shaped member 82 includes a relatively flat, elongate depending tab 84 which is of sufficient size to allow a lab technician to grasp, so he may manipulate the needle 52. A second member 86 transverse to tab 84 provides structural support for valves 54a and 54b which can be embedded therein or can be fixedly secured thereto.

OPERATION

The operation of the present inventive concept will be described with particular reference to its application in obtaining samples of a specimen under both anaerobic and aerobic conditions. The aerobic container 62, FIG. I, is fabricated from a flexible polyvinylchloride and is approximately half filled with a bacteria nutrient; the upper half of container 62 is occupied by oxygen, a gas containing oxygen or any other gas combinations which are necessary for the growth of a particular group of pathogenic bacteria. Valve 54a is closed and valve means 54b is opened by pressing inwardly on leaf spring members 56a, 56b. The flexible resilient side-wall 66 is pressed inwardly, as shown in broken lines, FIG. I, valve means 54b is closed and the container 62 will remain in a partially collapsed condition. The hollow needle 52 or open end 50 of tube 48 is placed in a liquid specimen, for example a blood vessel, urine, pus, milk or other liquid specimen and valve means 54b is opened which causes the specimen to be suctioned through tube 80 and into container 62. Valve means 54b is then closed and valve means 54a is opened and flexible membrane 42 is pressed inwardly, thereby forcing a portion of the prereduced media 46 outwardly through valve means 54a. Valve means 54a can be closed and the membrane 42 will remain in its collapsed condition, as illustrated in broken lines in FIG. I. The hollow needle 52 or open end 50 can be placed in the same liquid specimen; valve means 54a is opened and a sample of the specimen is suctioned through tube 48 into the interior of container 26. Thus samples of the same specimen are easily collected under both aerobic and anaerobic conditions.

Thus a concise and comprehensive assessment of the numerous advantages and merits realized by utilizing the present new and unobvious inventive concept are enumerated, as follows: (a) The membrane 42 functions as a pressure indicating and safety mechanism, in the sense, that membrane 42 will bulge increasingly outward if these should develop a pressure build-up within container 26, which indicates a chemical reaction has occurred. (b) Thus, a lab technician can insert the hollow needle of a syringe through stopper 34 and remove a desired quantity of the gas, thereby relieving the pressure within container 26. (c) A syringe, likewise, may be inserted through stopper 34 for removing a predetermined amount of the medium 46 to check for bacteria growth without introducing air or any other contaminants and without interrupting the anaerobic environment of bacteria growth. (d) In addition, membrane 42 functions to indicate whether an organism is gas producing and this is of diagnostic value. (e) Also, membrane 42 gives an indication as to the amount of gas produced within container 26.

While only one embodiment of the invention has been described in detail herein, shown in the accompanying drawing, and as operating in a specific manner in accordance with the provisions of the U.S. Patent Statutes, it will be evident that various, further modifications are possible in the arrangement and construction of the components of the present concept without departing from the scope and spirit of the invention.

What is desired to be secured and claimed by Letters Patent of the United States is:

1. An assembly for collecting and culturing a sample of a specimen in a controlled anaerobic and/or aerobic environment, in combination comprising:
    a first structural means defining an enclosure containing a medium, said means so constructed of a resilient, flexible material and arranged in such a manner that at least one wall portion can be forced inwardly when pressure is applied thereto by the fingers of a lab technician, said wall portion will inherently return to its normal configuration when the force being applied thereto is removed therefrom;

a second structural means defining another enclosure containing a predetermined quantity of sterile medium which substantially fills the interior thereof; said second structural means has a wall portion defining an opening that is closed and completely covered by a flexible, resilient membrane means which when forced inwardly or expanded outwardly will inherently return to its original configuration when the force being applied thereto is removed therefrom, said membrane means is so constructed and arranged for visually indicating an increase in pressure within said second structural means;

hollow conduit means for directing the flow of fluid, said conduit means having at least one open end and including conduit means operatively interconnecting the interior of both the first and second structural means with said open end; and valve means operatively associated with said conduit means for selectively directing the flow of fluid from the open end of the conduit means to either the first or second structural means.

2. The assembly for collecting and culturing a sample of a specimen recited in claim 1, further including a means for securing the membrane to the wall portion of the second structural means which defines the elongate opening, said securing means effectively creating a fluid seal between the membrane and the wall portion of the second structural means.

3. The assembly for collecting and culturing a sample of a specimen recited in claim 2, wherein the first structural means includes wall means defining another opening which is closed and completely covered by another flexible, gas-impermeable, self-sealing, resilient membrane so constructed and arranged that a lab technician can insert the hollow needle of a syringe through said membrane to remove a desired quantity of the medium for detection of aerobic bacterial growth.

4. The assembly for collecting and culturing a sample of a specimen recited in claim 3, wherein the second structural means includes wall means defining a hole which is closed and completely covered by an additional flexible, gas-impermeable, self-sealing, resilient membrane so constructed and arranged that a lab technician can insert the hollow needle of a syringe through said membrane to remove a desired quantity of the medium for detection of an anaerobic bacterial growth.

5. The assembly for collecting and culturing a sample of a specimen recited in claim 1, wherein means defining a hollow needle is secured to the open end of the conduit means and communicating therewith.

6. The assembly for collecting and culturing a sample of a specimen recited in claim 1, wherein the valve means operatively associated with the conduit means and disposed between the open end and the first structural means, includes a first valve means movable between an open position which permits the flow of fluid from the open end to the interior of the first structural means and a closed position which inhibits the flow of fluid from the open end of the conduit means to the interior of the first structural means, and a second valve means operatively associated with the conduit means and disposed between the open end and the second structural means, and second valve means being movable between an open position which permits the flow of fluid from the open end to the interior of the second structural means and a closed position which inhibits the flow of fluid from the open end of the conduit means to the interior of the second structural means.

7. The assembly for collecting and culturing a sample of a specimen recited in claim 1, further including means for releasably clamping the first structural means to the second structural means in a close side by side relationship.

8. The assembly for collecting and culturing a sample of a specimen recited in claim 7, wherein the releasable clamping means includes an outwardly extending leg member having a resilient spring portion disposed adjacent one end and the opposite end of said leg is fixedly secured to the second structural means, said spring portion extends upwardly and substantially normal to the leg, said spring portion so constructed and arranged for frictionally abutting and biasing the first structural means toward and into faying contact with the second structional means.

9. The assembly for collecting and culturing a sample of a specimen recited in claim 8, wherein the releasable clamping means and the second structure means are fabricated from the same material as a unitary subassembly.

10. The assembly for collecting and culturing a sample of a specimen recited in claim 8, wherein the leg member of the releasable clamping means has a greater tensile strength than the resilient spring portion.

* * * * *